United States Patent
Jennings et al.

(10) Patent No.: US 12,368,346 B1
(45) Date of Patent: Jul. 22, 2025

(54) DISTRIBUTED ELECTRICAL GENERATORS FOR TURBOFAN ENGINES

(71) Applicant: Hamilton Sundstrand Corporation, Charlotte, NC (US)

(72) Inventors: Andrew W. Jennings, Amana, IA (US); Martin J. Jennings, Oxford, IA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/633,281

(22) Filed: Apr. 11, 2024

(51) Int. Cl.
| | |
|---|---|
| *H02K 7/18* | (2006.01) |
| *F01D 15/10* | (2006.01) |
| *H02K 11/04* | (2016.01) |
| *H02K 11/225* | (2016.01) |

(52) U.S. Cl.
CPC ........... *H02K 7/1823* (2013.01); *F01D 15/10* (2013.01); *H02K 11/04* (2013.01); *H02K 11/225* (2016.01); *F05D 2220/36* (2013.01); *F05D 2220/762* (2013.01)

(58) Field of Classification Search
CPC .... H02K 7/1823; H02K 11/04; H02K 11/225; F01D 15/10; F05D 2220/36; F05D 2220/762
See application file for complete search history.

(56) References Cited

U.S. PATENT DOCUMENTS

| | | | | |
|---|---|---|---|---|
| 9,143,023 | B1* | 9/2015 | Uskert | H02K 99/20 |
| 10,897,182 | B1* | 1/2021 | Merrett | H02K 21/22 |
| 2005/0280664 | A1* | 12/2005 | DePaoli | F04D 29/362 |
| | | | | 347/5 |
| 2006/0254255 | A1* | 11/2006 | Okai | B64D 27/24 |
| | | | | 60/269 |
| 2007/0029803 | A1* | 2/2007 | Randall | F01D 15/10 |
| | | | | 310/90.5 |
| 2008/0088135 | A1 | 4/2008 | Novo Vidal | |
| 2008/0120980 | A1* | 5/2008 | Gemin | F01D 15/10 |
| | | | | 310/67 R |
| 2009/0021018 | A1 | 1/2009 | Grichnik | |
| 2009/0115295 | A1* | 5/2009 | Colin | F02K 3/06 |
| | | | | 310/67 R |
| 2012/0068466 | A1 | 3/2012 | Gilbert | |
| 2012/0068670 | A1* | 3/2012 | Bersiek | F03D 1/04 |
| | | | | 290/55 |
| 2014/0225550 | A1* | 8/2014 | Tchervenkov | H02P 29/60 |
| | | | | 318/473 |
| 2015/0315980 | A1* | 11/2015 | Edwards | F02C 9/30 |
| | | | | 60/740 |
| 2016/0123174 | A1* | 5/2016 | Ettridge | F01D 5/06 |
| | | | | 290/46 |
| 2018/0230845 | A1* | 8/2018 | Joshi | F02C 7/36 |
| 2020/0224547 | A1* | 7/2020 | Chong | H02K 21/14 |

(Continued)

*Primary Examiner* — Matthew T Largi

(57) ABSTRACT

An apparatus for generating electrical power includes a rotating member surrounded by a fixed structure. The apparatus also includes at least one magnet, each of which is located on the rotating member. The apparatus further includes at least one distributed generator module located on the fixed structure and configured to generate an electrical power signal responsive to movement of the at least one magnet past the at least one distributed generator module. The at least one distributed generator module is configured to be independently activated and deactivated responsive to a control signal.

20 Claims, 8 Drawing Sheets

(56) References Cited

U.S. PATENT DOCUMENTS

| | | | |
|---|---|---|---|
| 2021/0107664 A1* | 4/2021 | Rabbi | B64D 33/08 |
| 2022/0228505 A1* | 7/2022 | Simonetti | F02K 5/00 |
| 2024/0026860 A1 | 1/2024 | Marcel et al. | |

* cited by examiner

DISTRIBUTED ELECTRICAL GENERATORS FOR TURBOFAN ENGINES

TECHNICAL FIELD

This disclosure relates generally to electrical generators. More specifically, this disclosure relates to distributed electrical generators for turbofan engines.

BACKGROUND

When utilizing a fuel powered turbofan engine to produce electrical power, a traditional electrical generator is added external to the engine. In order to utilize the rotational power created by the turbofan engine within the generator, turbofan engines typically use gear sets, gearboxes and driveshafts. These types of systems are heavy due to the large high-current windings within the generator and the physically robust mechanical components required to convert the rotational energy of the turbofan engine into electrical energy. These requirements add physical complexity to the design, resulting in increased costs. The moving parts also affect the engines' maintenance cycles and lifetime costs.

SUMMARY

This disclosure relates to distributed electrical generators for rotating members within a fixed structure.

In a first embodiment, an apparatus for generating electrical power includes a rotating member surrounded by a fixed structure. The apparatus also includes a plurality of magnets, each of which is located at a different location on the rotating member. The apparatus further includes a plurality of distributed generator modules located on an interior surface of the fixed structure and configured to generate an electrical current responsive to movement of the plurality of magnets past the plurality of distributed generator modules. In addition, the apparatus includes at least one processor configured to independently activate and deactivate selected ones of the plurality of distributed generator modules.

In a second embodiment, an apparatus for generating electrical power includes a plurality of fan blades of a turbofan engine and an inlet cowl surrounding the plurality of fan blades of the turbofan engine. A plurality of magnets are each located at a different location on the plurality of fan blades. A plurality of distributed generator modules are located on an interior surface of the inlet cowl and configured to generate an electrical power signal responsive to movement of the plurality of magnets past the plurality of distributed generator modules. Each of the plurality of distributed generator modules further include a coil configured to detect movement of the plurality of magnets, power generation circuitry configured to generate the electrical power responsive to the detected movement of the plurality of magnets past the coil, a voltage sensing circuit configured to sense a first voltage from the coil and a second voltage of the electrical power signal and a current sensing circuit configured to sense a current of the electrical power signal. At least one processor independently activates and deactivates selected ones of the plurality of distributed generator modules responsive to the sensed first voltage, the sensed second voltage, and the sensed current.

In a third embodiment, a method for generating electrical power includes attaching a plurality of magnets to blades of a duct fan of a turbofan engine. The method also includes attaching a plurality of distributed generator modules to an interior surface of an inlet cowl. The method further includes generating an electrical current responsive to movement of the plurality of magnets past the plurality of distributed generator modules. The method also includes combining the generated electrical current of the plurality of distributed generator modules. In addition, the method includes independently activating and deactivating selected ones of the plurality of distributed generator modules.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 9, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Energy harvesting from various types of mechanical devices has been an area of intense focus as a method of increasing performance and efficiency while reducing operational costs. Large generation sources such as water dams and large wind turbines are common forms of electrical generation, but they require a great deal of resources and money to produce and are more susceptible to single points of failure. Distributed power sources are an alternative way to generate energy which rely on multiple small harvesting or generation sources which all contribute to a common load. Some examples of this include solar farms, micro turbine farms (either wind or water current based), and vibratory (kinetic energy) energy harvesting. The output of each individual generator source is low so that their components can be smaller. This enables more efficient circuit devices and wiring to be utilized. Though their individual output may be low, the combined outputs are used to create a larger aggregated source of usable power. Additionally, multiple, small generators allow the generation device to be located in closer proximity to the source of power when compared to single, large generators which must take into account physical space constraints.

Figure 1:
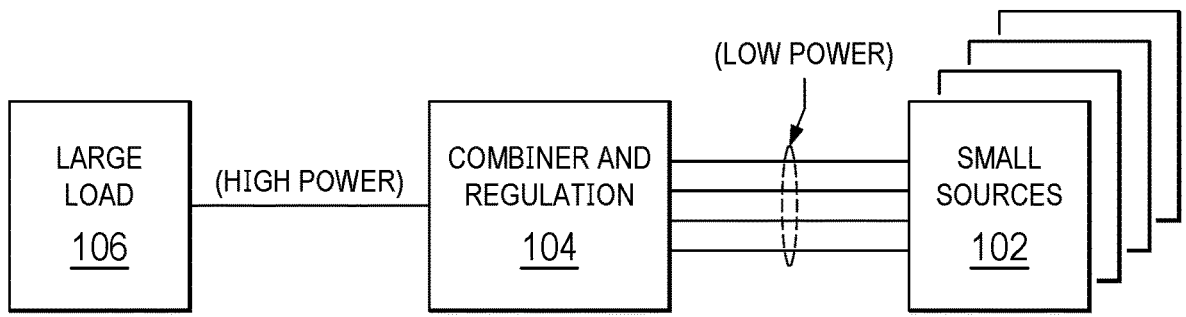
FIG. 1 illustrates a first example manner for utilizing a plurality of small electrical generation sources to generate power for a large load in accordance with this disclosure.
Figure 2:
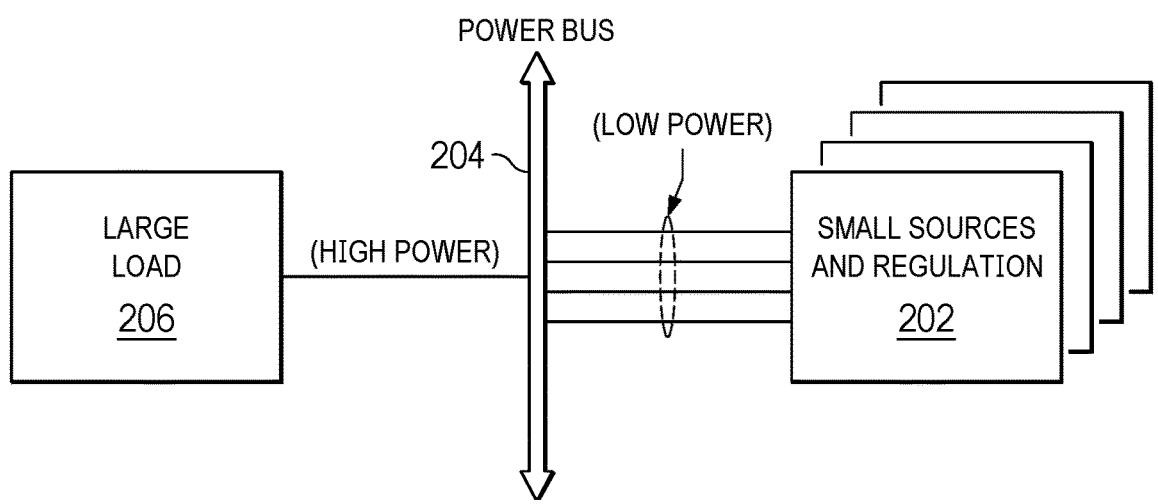
FIG. 2 illustrates a second example manner for utilizing a plurality of small electrical generation sources to generate power for a large load in accordance with this disclosure.

In order to aggregate the power from multiple smaller generation sources, examples such as that illustrated in FIGS. 1 and 2 may be utilized. In a first example, illustrated in FIG. 1, many small, unregulated power sources 102 generate power which is delivered to a single electronic combiner and regulation circuit 104 that combines the electrical energy and regulates the output voltage and power. The generated high power is then provided to a large load 106. As illustrated in FIG. 2, another architecture is illustrated which distributes the task of output voltage and current regulation to each individual power source 202. This allows all the outputs from the individual power sources 202 to be ganged together onto a single common bus 204. The power from the common bus 204 may then be provided to a large load 206.

Figure 3:
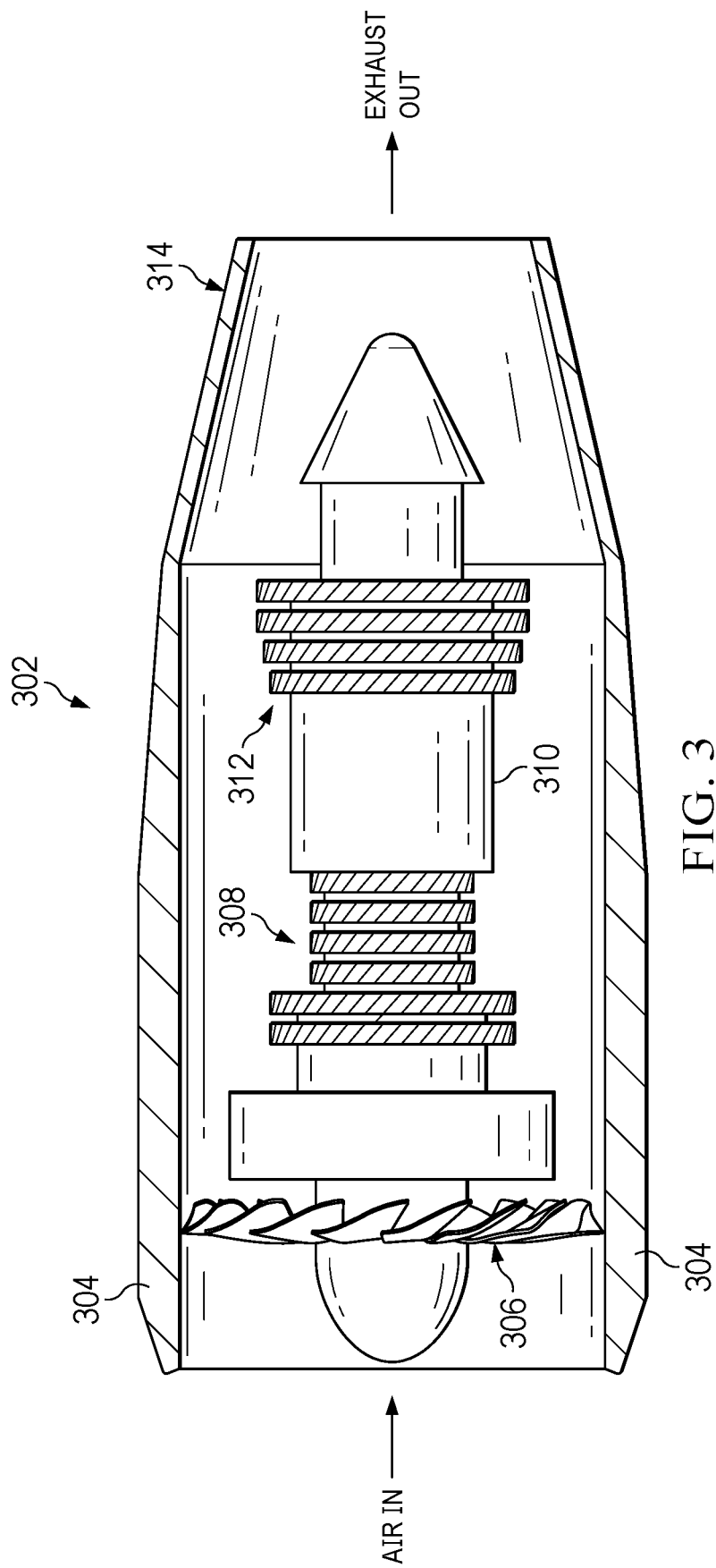
FIG. 3 illustrates a traditional turbofan engine.

In order to address the problems associated with large electrical generator components being associated with a traditional turbofan engine such as that illustrated in FIG. 3, a system of distributed electrical generator modules, as will be more fully described hereinbelow, may be implemented with a turbofan engine to replace traditional electrical power generation systems with a distributed power generation system that is integrated directly into the pre-existing structure of the turbofan engine assembly. A high-level depiction of the structure of the turbofan engine 302 includes an inlet cowl 304 defining an opening into which the air flows into the engine 302. A duct fan 306 includes blades for pulling air into the engine assembly. A compressor 308 compresses the input air and feeds it into a combustor 310 wherein the compressed air is mixed with fuel and ignited. The reactions within the combustor 310 (combustion chamber) provide exhaust gases which drive the turbine 312 and the exhaust gases are then ejected through a nozzle 314. The inlet cowl 304, duct fan 306 and compressor 308 comprise the cold side of the engine 302. The combustor 310, turbines 312 and exhaust nozzle 314 comprise the hot side of the engine 302.

A system according to this disclosure, as will be more fully described hereinbelow, applies electrical generator components within the duct fan 306 and inlet cowl 304 assemblies. However, other locations could be selected based upon the needs of the system. Furthermore, while the present description describes the use of the electrical generation system within a turbofan engine, it will be realized that other types of assemblies including rotating components within a fixed supporting structure could also be utilized in a similar manner.

Figure 4:
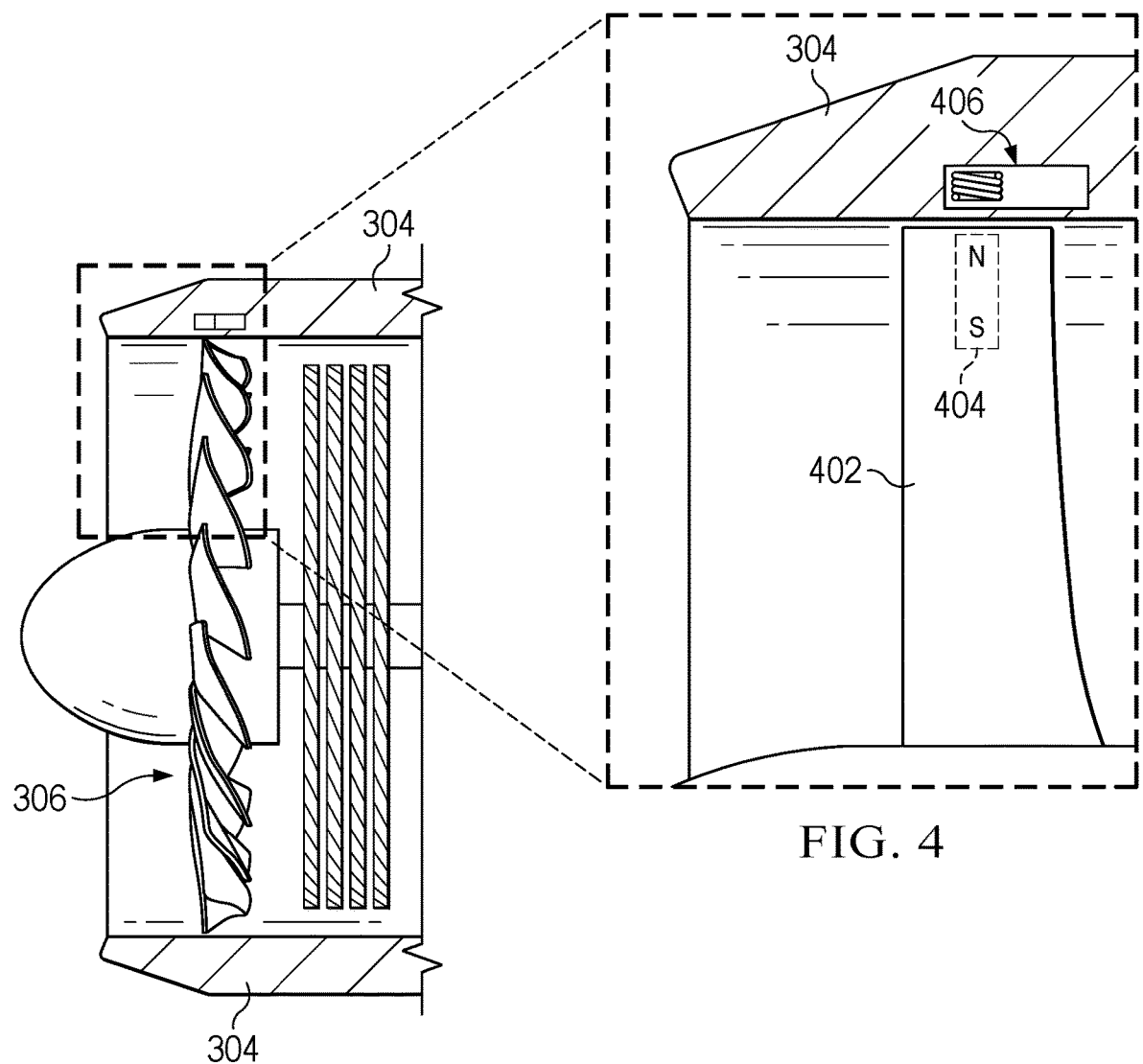
FIG. 4 illustrates an example distributed generator module with respect to a single fan blade in accordance with this disclosure.

Referring now to FIG. 4, there is illustrated the manner in which the distributed system of this disclosure is incorporated into the blades of the duct fan 306 and the inlet cowl 304. In order to integrate distributed power generators into the Turbofan engine 302 (FIG. 3), the duct blades 402 have incorporated into the ends thereof a permanent magnet structure. The magnet 404 that is embedded within the blade 402 acts as an alternator rotor. This facilitates the static magnetic fields that are necessary to produce electrical energy. The magnet 404 is fitted into the blade 402 as part of the blade assembly, but before duct fan 306 assembly. The installation process would leave an exposed portion of the magnet 404 as more particularly illustrated in FIG. 5.

Figure 5:
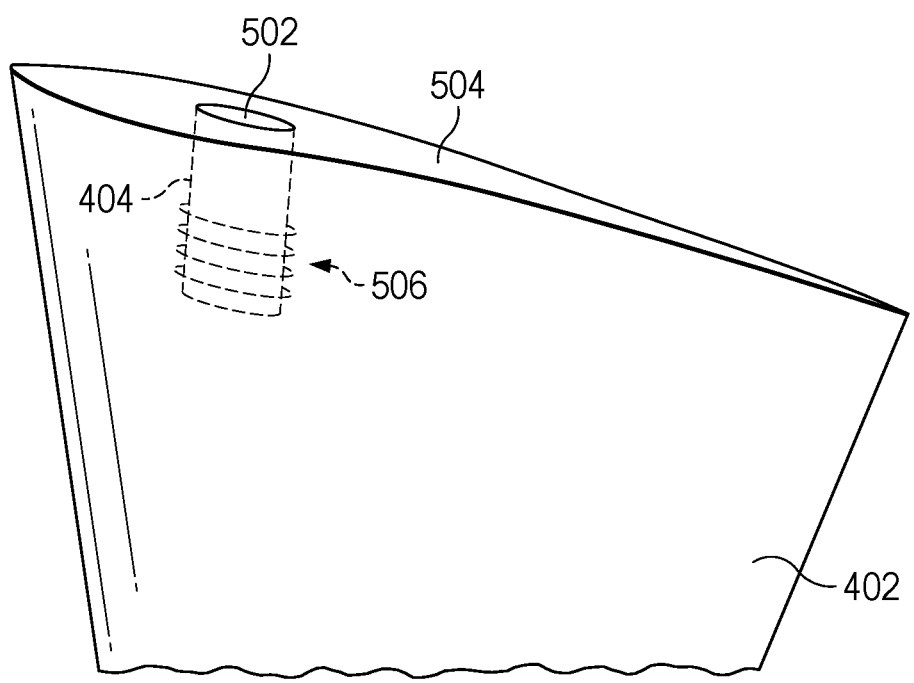
FIG. 5 illustrates an example turbofan blade having installed magnets in accordance with this disclosure.

FIG. 5 illustrates the magnet 404 that is installed within the fan blade 402. The exposed magnet 502 is on the fan blade end 504 to enable detection by the distributed generator module 406 (FIG. 4) to induce the voltage within the distributed generator module. The magnet 404 will be secured within the fan blade 402 via some type of magnet retention feature 506. This could include some type of locking mechanism, adhesive mechanism or other structure which would secure the magnet 404 securely within the blade 402 and maintain the magnet in its position even during high-speed operation of the duct fan 306 (FIG. 3). While traditional machining techniques (such as CNC milling) could be used to introduce the above-described features, adaptive manufacturing may present a more efficient method through which magnets 404 can be integrated directly into the fan blade 402 during fan blade fabrication.

Referring now back to FIG. 4, small, distributed generator modules 406 including embedded coil assemblies would be fitted along the perimeter of the inlet cowl 304. The distributed generator modules 406 act as alternator stators. The distributed generator modules 406 may additionally include power regulation capabilities packaged within the modules. The distributed generator modules 406 would be installed into a backplane or electrical wiring bus that traverses the interior of the inlet cowl 304. The backplane or bus would accept bus power and bus communications. The power would be delivered to the aircraft power systems while the communications would likely originate to and from the engine controller for the aircraft on which the engine is mounted.

Figure 6:
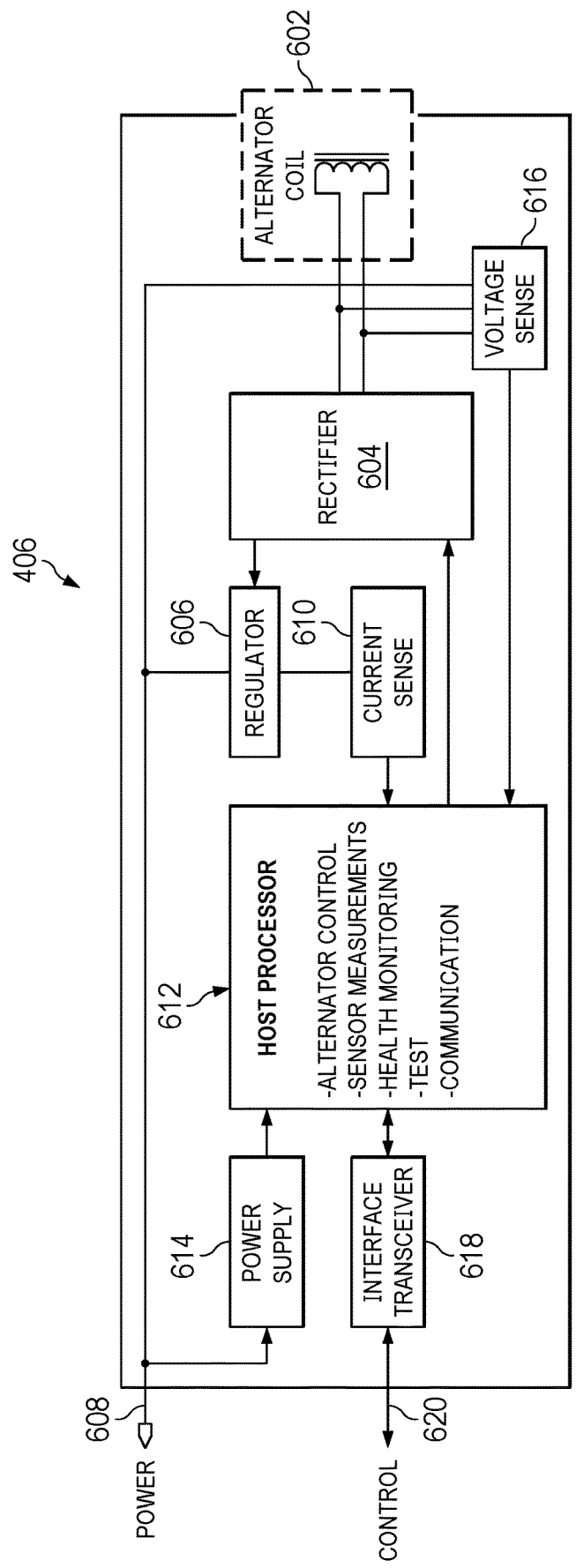
FIG. 6 illustrates an example distributed generator module for generating electrical power in accordance with this disclosure.

Referring now to FIG. 6, there is more particularly illustrated block diagram of the distributed generator module 406. The distributed generator module 406 includes an alternator coil 602 that reacts to the movement of the magnets 404 as they pass by the distributed generator module 406 that is located on the interior surface of the inlet cowl 304 (FIG. 4). The output of the alternator coil 602 is connected to a rectifier 604 that converts the output AC signal of the coil 602 into a DC signal. The DC signal from the rectifier 604 is input to a voltage regulator 606. The voltage regulator 606 generates a regulated output voltage that is provided as an output power signal 608 and to a power supply 614. The power supply 614 also provides power to the host processor 612. The voltage regulator 606 additionally provides an output to current sense circuit 610. The current sense circuit 610 provides a current sense signal to a host processor 612. The output of the alternator coil 602 is also monitored by a voltage sense circuit 616. The voltage sense circuit 616 also receives an input from the regulated voltage signal provided by the voltage regulator 606. The voltage sense circuit 616 provides a voltage control signal to the host processor 612 responsive to the monitored output of the coil 602 and the output power signal of the voltage regulator 606. The host processor 612 can receive control signals via an interface transceiver 618 that is connected with a control input/output 620. The interface transceiver provides data communications for relating command and control information between the host processor 612 and the rest of the system. The control input/output 620 can be connected to the engine controller (not shown) of the host aircraft in which the turbofan engine 302 (FIG. 3) is installed or other control sources when the system is not a part of a turbofan engine.

The host processor 612 can perform a number of control functions with respect to the distributed generator module 406. These include alternator control, sensor measurements, health monitoring, test and communications. Alternator control function involves the process of activating and deactivating the distributed generator module 406 via switch mechanisms within the rectifier 604. For example, when a turbofan engine 302 is off, the distributed generator modules 406 would be deactivated until the engine is spun up to a minimum speed. This is to limit the load on the engine 302 until the engine is at sufficient power. The number of distributed generator modules 406 that are active can also be changed based on the current operating state of the engine 302. For example, when the aircraft is climbing more distributed generator modules 406 can be turned off since more power is required for climbing. Alternatively, the distributed generator modules 406 can be turned on when the aircraft is at cruising speed or when the aircraft is descending, and less power is required of the engine. The activation and deactivation of the distributed generator module 406 is achieved via the control input/output 620 or control signals generated internally via the processor 612.

The sensor measurement function is enabled by the current sense signals provided by the current sense circuit 610 and the voltage sense signals from the voltage sense circuit 616 to be monitored by the host processor 612 and enable the processor to detect problems with the operation of the turbofan engine 302 or the distributed generator module 406. The processor 612 could disable the operation of the distributed generator module 406 responsive to determination of a problem. Alternatively, the host processor 612 may forward sensed signals to an engine controller for the aircraft, and the engine controller can determine if there are engine issues based on sensor inputs from multiple distributed generator modules 406 and provide notifications based on detected engine operation issues.

The health monitoring function can monitor the engine health based on received input signals and control operation of the distributed generation module 406 when problems with engine health are detected. The Test function can control operations of the distributed generation module 406 to test operation of the engine on which the distributed generator module 406 is installed. The results of the sensed outputs based on the performed test operations may then be provided as output from the distributed generation module 406. The communication functions enable the distributed generation module 406 to communicate with external controllers over the control input/output port 620.

Other functions which may be provided by the distributed generator module 406 responsive to control signals provide by the host processor 612 responsive to sensed current and voltage further include managing flux within the coil 602 to provide optimal power from the inductor and detecting overvoltage conditions and turning off the module responsive detected overvoltage conditions or metering the output of the coil 602 from the distributed generator module 406 responsive to the detected overvoltage conditions. The values sensed by the distributed generator module 406 can also be used to determine the blade 402 position within the engine. The distributed generation module 406 can also include a temperature sensor to detect the temperature of the engine near the module.

Figure 7:
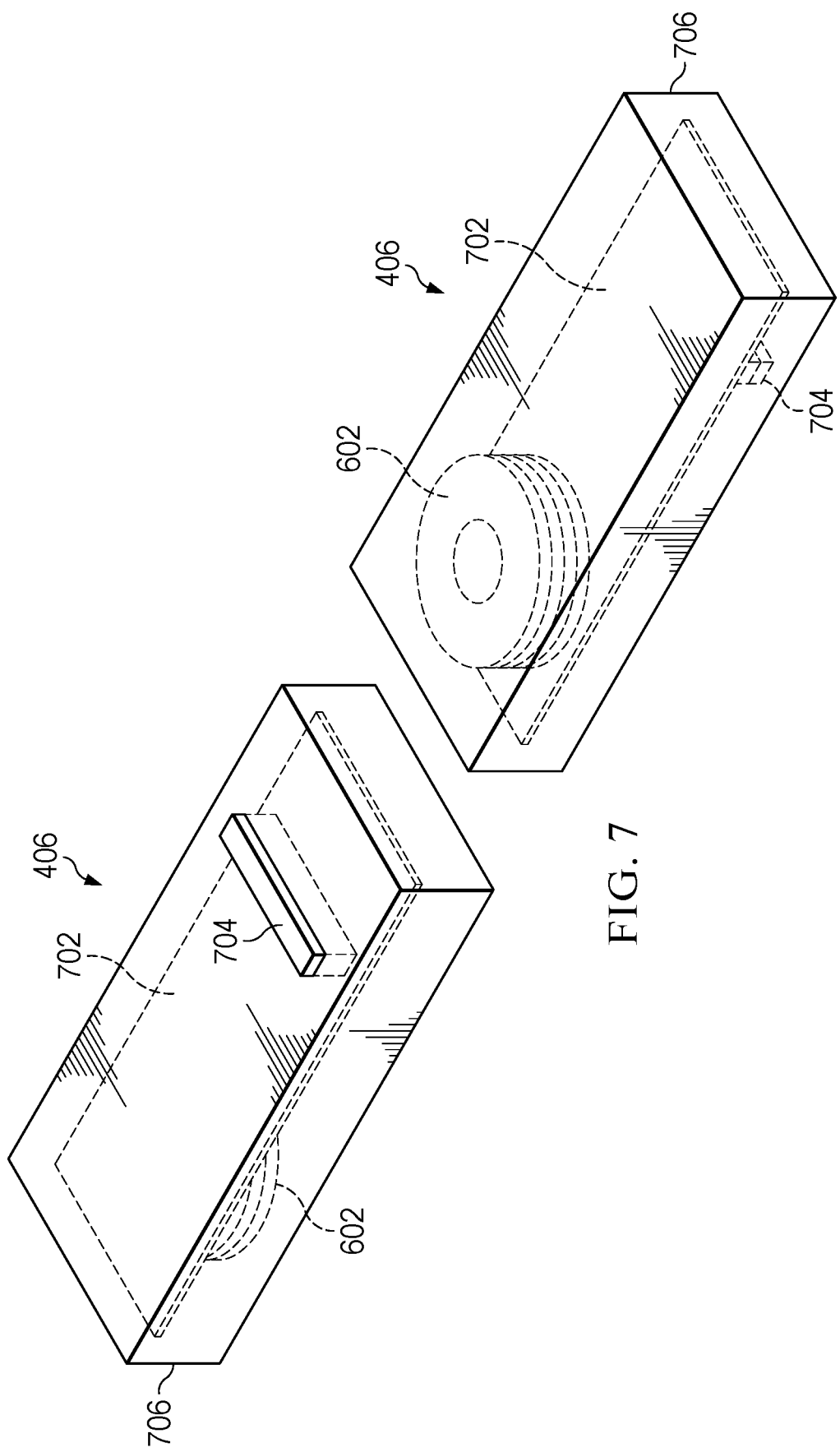
FIG. 7 illustrates an example transparent perspective view of a distributed generator module in accordance with this disclosure.

Referring now to FIG. 7, there is illustrated a physical depiction of the distributed generator module 406. The distributed generator module 406 incorporates the coil 602 that interfaces with a circuit card 702 that implements the various components discussed with respect to FIG. 6. The circuitry upon the circuit card 702 is interacted with through a connector 704 that provides interaction between the outside world and the control interface 620 and the power signals generated by the coil 602 detecting the passage of magnets 404 (FIG. 4) in close proximity thereto. The coil 602, connector 704 and circuit card 702 may be encased within a potting material or chassis enclosure 706.

Figure 8:
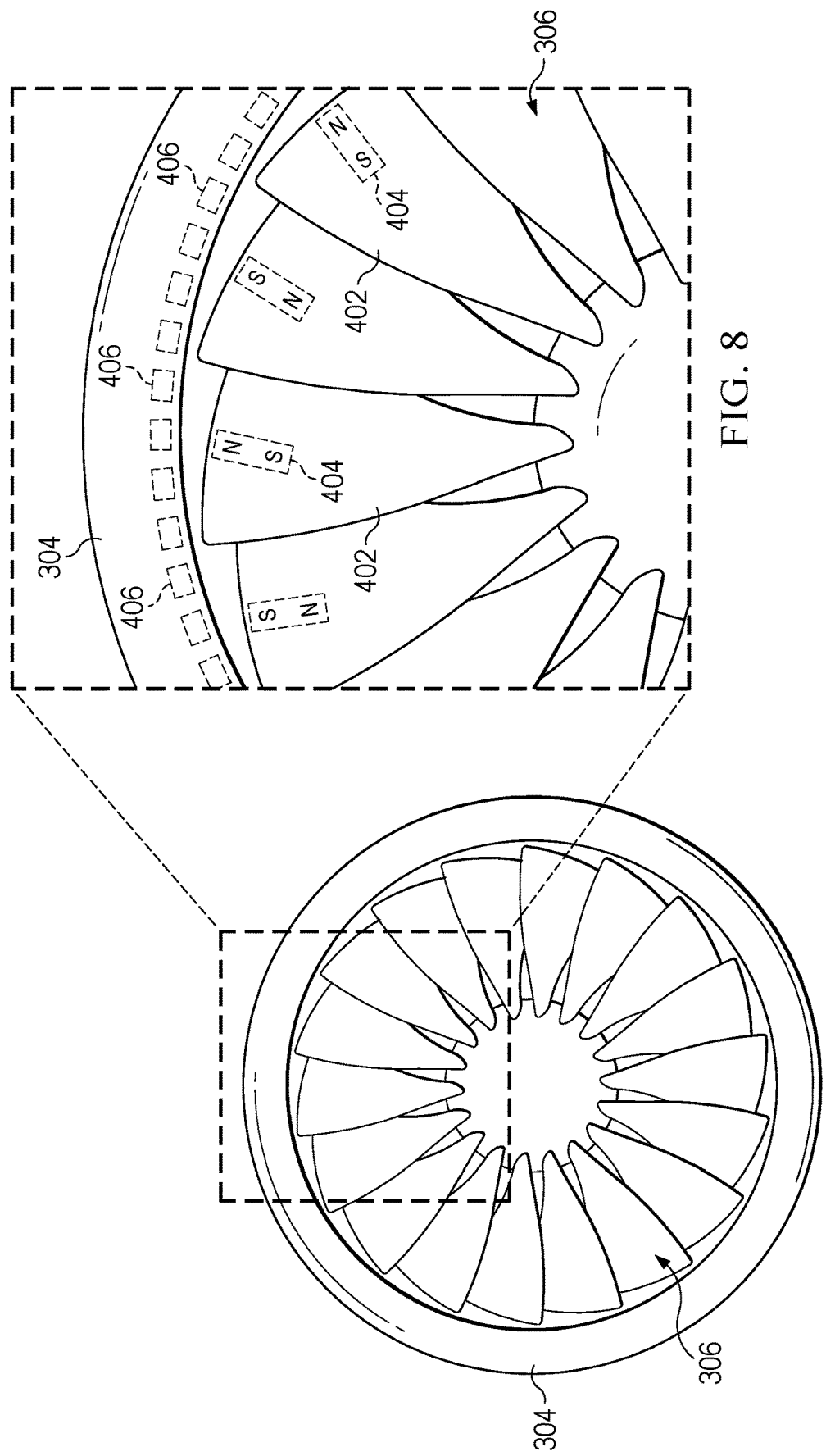
FIG. 8 illustrates an example distributed electrical generator module with respect to multiple fan blades in accordance with this disclosure.

Referring now to FIG. 8, there is illustrated the implementation of the magnet 404 and distributed generator modules 406 at multiple locations within the inlet cowl 304 and duct fan 306. The distributed system would be propagated throughout an entire section of the inlet portion of the engine. There is illustrated in FIG. 8, a magnet 404 included within every fan blade 402 of the duct fan 306. Multiple distributed generator modules 406 are placed around the interior perimeter of the in the inlet cowl 304. The multiple distributed generator modules 406 have inherent redundancy. Additionally, each blade 402 could include multiple magnets for magnetic pole configurations, or as is determined through design implementation they could exist in only a subset of the entire number of fan blades 402.

Figure 9:
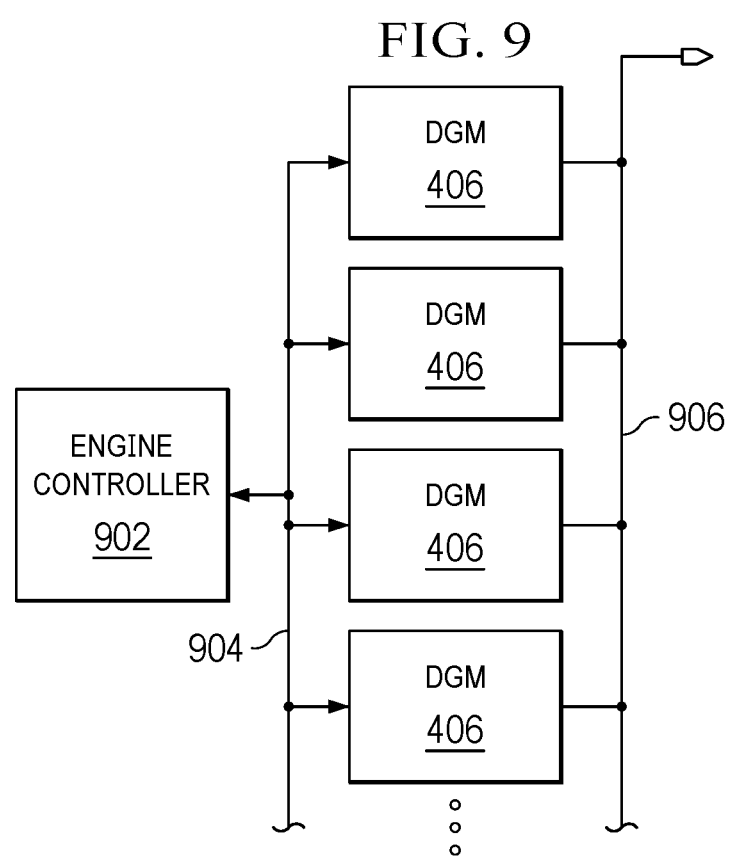
FIG. 9 illustrates example electrical connections for a system of distributed electrical generator modules in accordance with this disclosure.

Referring now to FIG. 9, there is more particularly illustrated the control and power input/output architecture with respect to the distributed generation modules 406. Each Distributed Generation Module 406 as disclosed previously includes a control input/output that is provided to its host processor 612 (FIG. 6). This enables the distributed generator modules 406 to communicate control signals between the module and for example an engine controller 902 of the aircraft on which the turbofan engine is installed. The communications between the engine controller 902 and the distributed generator modules 406 occur over a control bus 904. This enables the distributed generator modules 406 and engine controller 902 to perform the various control functionalities described hereinabove. As the distributed system including the distributed generation modules 406 is scalable the number of distributed generation modules 406 may be adjusted to any desired number that may be located on the device such as the turbofan engine and controlled by merely interconnecting the distributed generation module 406 and the engine controller 902 over the control bus 904. Additionally, each distributed generation module 406 within the system is connected to a power bus 906 for providing power to various aircraft systems. This is provided by the output power signal 608 (FIG. 6) of the distributed generation module 406 as described previously and allows the power from each of the distributed generator modules 406 to be aggregated to be used by the aircraft.

The distributed electric generator including distributed generator modules 406 and magnets 404 within turbofan engines 302 can replace legacy electrical generator systems that are bulky and heavy with many small electrical generators that are integrated into the structure of the turbofan engine 302. The system integrates electrical generation into a traditional turbofan engine in space that would otherwise be unused. This approach reduces costs, weight, moving parts and maintenance cycles compared to legacy electrical generator assemblies. A distributed generator system is redundant by nature, and therefore more fail proof. The included integrated prognostic health monitoring and the information captured can aid other engine parameter data sets for better flight logging or error detection.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for generating electrical power, the apparatus comprising:
    a rotating member surrounded by a fixed structure;
    a plurality of magnets, each located at a different location on the rotating member;
    a plurality of distributed generator modules located on an interior surface of the fixed structure and each configured to generate a regulated direct current (DC) power signal responsive to movement of the plurality of magnets past the plurality of distributed generator modules; and
    at least one processor configured to independently activate selected ones of the plurality of distributed generator modules to allow each to generate its respective regulated DC power signal and deactivate other selected ones of the plurality of distributed generator modules to stop each from generating its respective regulated DC power signal to limit power used by the plurality of distributed generator modules.

2. The apparatus of claim 1, wherein the distributed generator modules are further configured to sense one or more operating conditions of the rotating member and provide an output responsive to the one or more sensed operating conditions.

3. The apparatus of claim 1, wherein each of the plurality of distributed generator modules further comprises a transceiver configured to enable communication between the associated distributed generator module and a remotely-located controller.

4. The apparatus of claim 1, wherein each of the plurality of distributed generator modules further comprises:
    a coil configured to detect the movement of the plurality of magnets;
    power generation circuitry configured to generate the electrical power responsive to the detected movement of the plurality of magnets past the coil;
    a voltage sensing circuit configured to sense a first voltage from the coil and a second voltage of the regulated DC power signal; and
    a current sensing circuit configured to sense a current of the regulated DC power signal; and
    wherein the at least one processor is configured to activate and deactivate the power generation circuitry responsive to the sensed first voltage, the sensed second voltage, and the sensed current.

5. The apparatus of claim 4, wherein the power generation circuitry comprises:
    a rectifier circuit configured to receive an alternating current (AC) signal provided by the coil and generate a DC signal responsive thereto, wherein the at least one processor is configured to activate and deactivate the rectifier circuit; and
    a voltage regulator configured to regulate a voltage of the generated DC signal.

6. The apparatus of claim 1, further comprising:
    a power supply configured to power the at least one processor responsive to the regulated DC power signal.

7. The apparatus of claim 1, wherein the rotating member comprises a plurality of fan blades of a turbofan engine and the fixed structure comprises an inlet cowl.

8. An apparatus for generating electrical power, the apparatus comprising:
    a plurality of fan blades of a turbofan engine;
    an inlet cowl surrounding the plurality of fan blades of the turbofan engine;
    a plurality of magnets, each located at a different location on the plurality of fan blades;
    a plurality of distributed generator modules located on an interior surface of the inlet cowl and each configured to generate a regulated direct current (DC) power signal responsive to movement of the plurality of magnets past the plurality of distributed generator modules, wherein each of the plurality of distributed generator modules comprises:
        a coil configured to detect the movement of the plurality of magnets;
        power generation circuitry configured to generate the electrical power responsive to the detected movement of the plurality of magnets past the coil;
        a voltage sensing circuit configured to sense a first voltage from the coil and a second voltage of the regulated DC power signal; and
        a current sensing circuit configured to sense a current of the regulated DC power signal; and
    at least one processor configured to independently activate selected ones of the plurality of distributed generator modules to allow each to generate its respective regulated DC power signal and deactivate other selected ones of the plurality of distributed generator modules to stop each from generating its respective regulated DC power signal to limit power used by the plurality of distributed generator modules responsive to the sensed first voltage, the sensed second voltage, and the sensed current.

9. The apparatus of claim 8, wherein the distributed generator modules are further configured to sense one or more operating conditions of the plurality of fan blades and provide an output responsive to the one or more sensed operating conditions.

10. The apparatus of claim 8, wherein each of the plurality of distributed generator modules further comprises a transceiver configured to enable communication between the associated distributed generator module and a remotely-located controller.

11. The apparatus of claim 8, wherein the power generation circuitry comprises:
a rectifier circuit configured to receive an alternating current (AC) signal provided by the coil and generate a DC signal responsive thereto, wherein the at least one processor is configured to activate and deactivate the rectifier circuit; and
a voltage regulator configured to regulate a voltage of the generated DC signal.

12. The apparatus of claim 8, further comprising:
a power supply configured to power the at least one processor responsive to the regulated DC power signal.

13. A method for generating electrical power, the method comprising:
attaching a plurality of magnets to a rotating member;
attaching a plurality of distributed generator modules to a fixed structure surrounding the rotating member;
generating a regulated direct current (DC) power signal responsive to movement of the plurality of magnets past each of the plurality of distributed generator modules;
combining the generated regulated DC power signals of the plurality of distributed generator modules; and
independently activating selected ones of the plurality of distributed generator modules to allow each to generate its respective regulated DC power signal and deactivating other selected ones of the plurality of distributed generator modules to stop each from generating its respective regulated DC power signal to limit power used by the plurality of distributed generator modules using at least one processor.

14. The method of claim 13, further comprising:
sensing one or more operating conditions of the rotating member and the fixed structure using the distributed generator modules; and
providing an output responsive to the one or more sensed operating conditions.

15. The method of claim 13, wherein independently activating the selected ones of the plurality of distributed generator modules and deactivating the other selected ones of the plurality of distributed generator modules comprise:
receiving communication between (i) the selected ones of the plurality of distributed generator modules and the other selected ones of the plurality of distributed generator modules and (ii) a remotely-located controller using a transceiver.

16. The method of claim 13, wherein generating the regulated DC power signal comprises:
detecting the movement of the plurality of magnets past one of the distributed generator modules using a coil;
generating the electrical power responsive to the detected movement of the plurality of magnets past the coil using power generation circuitry;
sensing a first voltage from the coil and a second voltage of the regulated DC power signal using voltage sensing circuitry; and
sensing a current of the regulated DC power signal using a current sensing circuit.

17. The method of claim 16, wherein independently activating the selected ones of the plurality of distributed generator modules and deactivating the other selected ones of the plurality of distributed generator modules comprise:
activating the selected ones of the plurality of distributed generator modules and deactivating the other selected ones of the plurality of distributed generator modules responsive to at least one of the sensed first voltage, the sensed second voltage, and the sensed current.

18. The method of claim 16, wherein generating the regulated DC power signal further comprises:
receiving an alternating current (AC) signal provided by the coil by a rectifier circuit;
generating a DC signal responsive to the AC signal at the rectifier circuit;
selectively activating and deactivating the rectifier circuit; and
regulating a voltage of the generated DC signal using a voltage regulator.

19. The method of claim 13, further comprising powering the at least one processor using a power supply responsive to the regulated DC power signal.

20. The method of claim 13, wherein the rotating member comprises a plurality of fan blades of a turbofan engine and the fixed structure comprises an inlet cowl.

* * * * *